United States Patent [19]
Hibble

[11] Patent Number: 5,958,173
[45] Date of Patent: Sep. 28, 1999

[54] METHOD OF FABRICATING A FILTER SCREEN

[75] Inventor: Barry F. Hibble, New Castle, N.H.

[73] Assignee: Micronics, Portsmouth, N.H.

[21] Appl. No.: 09/010,700

[22] Filed: Jan. 22, 1998

[51] Int. Cl.[6] .................................................. B32B 31/26
[52] U.S. Cl. ................................. 156/272.4; 156/274.8; 156/293; 156/309.6; 210/226; 210/499
[58] Field of Search ..................... 156/91, 272.4, 156/273.7, 274.4, 274.8, 275.7, 293, 309.6; 219/633, 634; 210/226, 227, 499, 503, 505

[56] References Cited

U.S. PATENT DOCUMENTS

| | | | |
|---|---|---|---|
| 4,497,709 | 2/1985 | Nicholson | 210/499 |
| 4,765,859 | 8/1988 | Heath et al. | 156/272.4 |
| 5,326,471 | 7/1994 | Pietzsch | 210/499 |

FOREIGN PATENT DOCUMENTS 1 459 099  12/1976  United Kingdom .

Primary Examiner—Michael W. Ball
Assistant Examiner—Michael A Tolin
Attorney, Agent, or Firm—Lahive & Cockfield, LLP

[57] ABSTRACT

A method is provided for fixedly joining a cloth, a cloth-like fabric or a synthetic mesh to a rigid or semi-rigid hub to form a seal, which secures the cloth, the cloth-like fabric or the synthetic mesh to the hub by enclosing the edge of the material between the neck of the hub and a ring, and causing the fusing of the hub and ring through induction heating of a bonding agent The assembly is advantageously used as a filter screen in a filter press.

11 Claims, 3 Drawing Sheets

METHOD OF FABRICATING A FILTER SCREEN

FIELD OF THE INVENTION

The invention relates generally to a method of fixedly joining a cloth, a cloth-like fabric or a synthetic mesh to a rigid or semi-rigid hub to form a seal, and more particularly to secure a cloth, a cloth-like fabric or a synthetic mesh to a hub by enclosing the edge of the material between the neck of the hub and a ring, and causing the fusing of the hub and ring through induction heating of a bonding agent The assembly is advantageously used as a filter screen in a filter press. However, it may also be used to join a textile medium to any formed plastic assembly.

BACKGROUND OF THE INVENTION

Filter presses as commonly utilized in the clay, chemical, or mining industries employ large areas of a textile material to form a filtering screen. The textile material is typically attached to a tubular hub that allows the material to be filtered to pass through successive filtering chambers in the press. The tubular hub must be securely attached to the filtering material to prevent leakage, and is usually constructed of a textile tube or a thermoplastic or rubber material.

Conventional methods for joining the filtering material to the thermoplastic tubular hub include sewing the parts together. This approach is labor intensive and thus expensive. Moreover, the sewing tends to create weaknesses in the join due to the stitch holes. Other methods include adhesive and bonding agents to secure the filtering cloth to the tubular hub, but these techniques are time consuming since the adhesive must set to form the bond, and is not consistently reliable.

U.S. Pat. No. 4,765,859 describes a method of joining filter cloth to a rubber tubular hub for use as a filter screen in a filtering press. The hub consists of a cylindrical tube that includes two annular flanges protruding radially outward from the circumference of the tube at each end. The hub is fabricated from a rubber material that is collapsible. A filtering screen is then constructed by joining two filter cloths to the hub at each end of the tube. One filter cloth is joined to the hub at the inside surface of one flange, while the other filter cloth is joined to the inside surface of the other flange. The filter cloth and hub are bonded together by induction heating to form a seal to prevent leakage of the filtered material.

The filter is manufactured by forming a circular hole in each cloth. Each circular hole has a diameter that is smaller than the diameter of the outer circle formed by each protruding flange so as to overlap the inside perimeter of each flange when positioned. To locate each filter cloth within the inside space between the flanges, at least one end of the tubular hub must be collapsed to allow each of the filter cloths to fit over the flange and be contained within. A pre-formed metal filled polypropylene ring or strand is placed between the filter cloth and the protruding flange. This assembly rests upon a split copper ring that is capable of generating a magnetic field at RF frequencies when electrically activated. Two split ring presser coils or half collars are placed between the flanges to pressure the inside surface of the flange, the polypropylene ring and the filter cloth together in forced contact. A flat presser plate is mounted on a vertical cylinder to clamp the flange, the polypropylene ring and the cloth together between the presser coils and the plate. When the bottom coil is electrically activated heat generated by RF induction heating of the metal particles within the polypropylene ring causes the polypropylene to soften. The clamping force presses the softened polypropylene into the filter cloth and the flange to form a lap joint. After the electrical activation cycle, the part is held clamped for a cooling cycle to allow the flange and filter cloth to bond together.

While U.S. Pat. No. 4,765,859 describes a clear advance over the prior art, there are certain disadvantages associated with the process. The process is relatively time consuming since the copper rings and collars must be manually fitted between the flanges of the hub. Furthermore, a flat weld requires sufficient cooling time before removal from the clamps to ensure good adhesion, and if removed prematurely the flat lap joint may be weakened. Consequently, the process significantly slows the manufacturing time, and is not compatible with an automated process.

A gap is necessarily created between the abutting collars, allowing the heated material to flow into the gap. The heated material that flows through the cloth into the gap weakens the cloth, and creates a point of likely failure during operation of the filter. As part of the process "weld" material is squeezed to the outside edge of the flange and overflows onto the circumference or lip of the flange. When cooled the "weld" material, mixed with the metal particles, is naturally abrasive, and any flexing of the filter cloth against this abrasive edge will eventually be a cause of failure.

The process is only useful in bonding like materials for the hub and filter cloth. Incompatible materials will not join with sufficient strength for filtering applications. Moreover, lighter materials are prone to a weakened join at the inside or outside edge of the join.

The process further requires that the hub be constructed of a flexible material so that it can be collapsed to allow the filter cloth to fit over it. The choice of materials that can be used for the hub is thus restricted, since a rigid material will likely crack or deform under the compression.

It is thus desirable to find a new method for securely joining a mesh material such as a cloth fabric or synthetic material, as commonly used in filtering applications, to a hub that eliminates the above stated disadvantages of the prior art. More specifically, it is desirable that the process eliminate or at least reduce the labor intensive aspects of known processes, in order to improve productivity and manufacturing efficiency. It is further desirable that the process create a reliable and secure bond between the filtering cloth and the hub so that the filtering material will not separate from the hub in a filtering operation.

SUMMARY OF THE INVENTION

The invention addresses the need for an efficient method for fabricating and manufacturing a filter screen as used in filter presses.

In one aspect of the invention, a filter cloth is joined to a hub and secured thereto by induction heating of a bonding agent. An edge of the filter cloth is positioned in a channel grooved from the wall of the hub, and maintained there by a ring enclosing the cloth within the channel.

In a further aspect of the invention, the bonding agent is mixed with a metal powder that is agitated by RF induction heating. For a filter material such as polypropylene that is compatible with a polypropylene hub, and ring, the bonding agent softens due to the induction heating of the metal powder, and upon cooling a homogeneous joint is formed between the filter cloth, the hub and ring, within the channel. For a non compatible filter material, a material that will not form a chemical bond to the hub and ring, the induction heating again causes the bonding agent to soften and fill the void within the channel. The polypropylene ring and hub fuse together to form a mechanical joint for securely trapping the filter cloth within the channel.

In yet a further aspect of the invention, the hub to which the filter cloth is sealably joined need not be fabricated from a material that is flexible and collapsible as in prior art filter screens.

In a still further aspect of the invention, while the bonding agent is softened by induction heating to bind the filter cloth within the channel of the hub, the retaining ring is clamped into the channel to form a watertight sealable bond.

In a further aspect of the invention, the novel method described herein advantageously allows for the bonding of lighter materials than otherwise permitted in filter screen applications.

In a still further aspect of the invention, the method of the instant invention does not require that the hub of the filter screen and the filter cloth both be polypropylene based in order to bind together as in prior induction heating methods.

In a further aspect of the invention, the novel method described herein advantageously may be performed using an automated process, and thus thereby producing filter screens in a more efficient and cost effective manner.

BRIEF DESCRIPTION OF THE DRAWINGS

The foregoing and other objects, features and advantages of the invention will be apparent from the following description and from the accompanying drawings, in which like reference characters refer to the same parts throughout the different views. The drawings illustrate principles of the invention and, although not to scale, show relative dimensions.

DETAILED DESCRIPTION OF AN ILLUSTRATIVE EMBODIMENT

Figure 1:
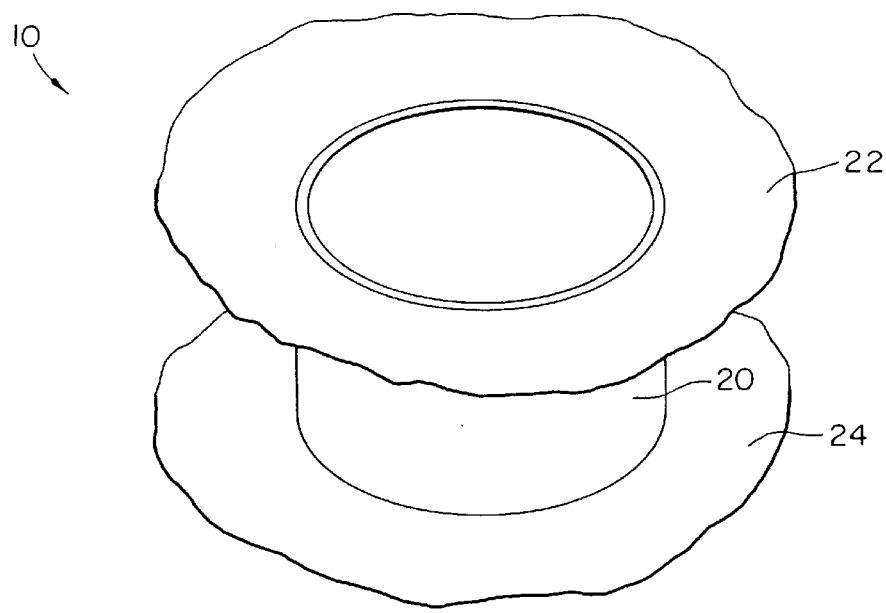
FIG. 1 is a perspective view of a filter screen in accordance with the invention.

A filter screen 10 is shown in FIG. 1, that is a component of a filtering chamber for a filter press. Filter screen 10 is comprised of a filtering hub 20 with two sheets of filtering cloths 22 and 24 sealably joined thereto at each opposing end of hub 20. Filter cloths 22 and 24 may be fabricated from a natural or man-made material or any combination thereof, which is acceptable for filtering applications. It is to be appreciated that only a small portion of each filter cloth 22 and 24 is shown in FIG. 3.

Figure 2:
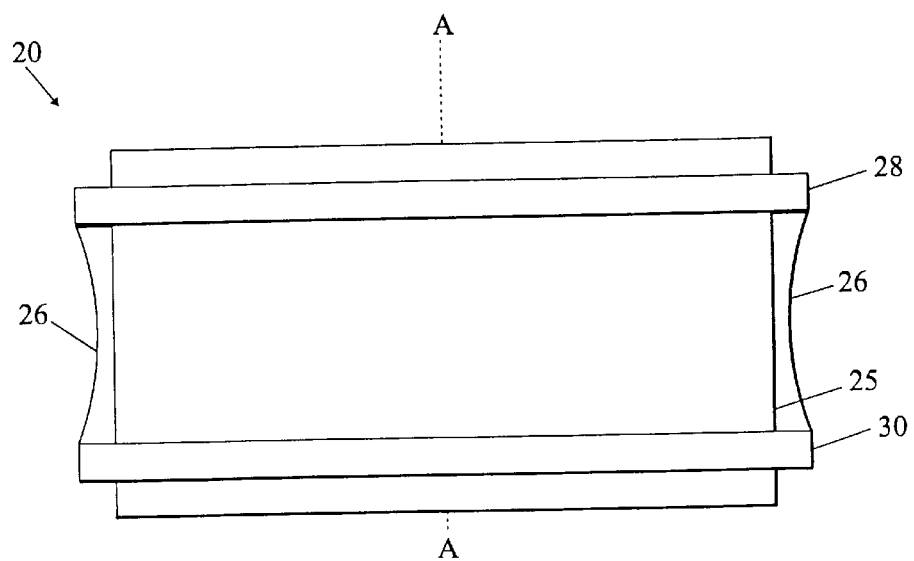
FIG. 2 is a side view of a filter hub.

Referring now to FIG. 2, there is shown a side view of one instance of a filter hub 20 in accordance with the current invention. Filter hub 20 is preferably a cylindrical tube with longitudinal axis A, but other shapes such as a polygonal tube or an elliptical tube are also considered within the scope of the invention. Hub 20 has a longitudinal bore or cavity therethrough to allow the filtered materials to pass to the next filter chamber. Hub 20 can be constructed from polypropylene, nylon, or polyester materials. Unlike the prior art methods for producing hubs for filter screens, the materials may be rigid and not collapsible. In the illustration of FIG. 2, hub 20 comprises a cylindrical tube 25 with two necks 28 and 30, surrounding the periphery of the tube 25, one at each opposing end of the hub 20. Supports 26 are spaced around the outside wall of tube 25 and connect to each of the necks 28 and 30 to provide structural support.

Figure 3:
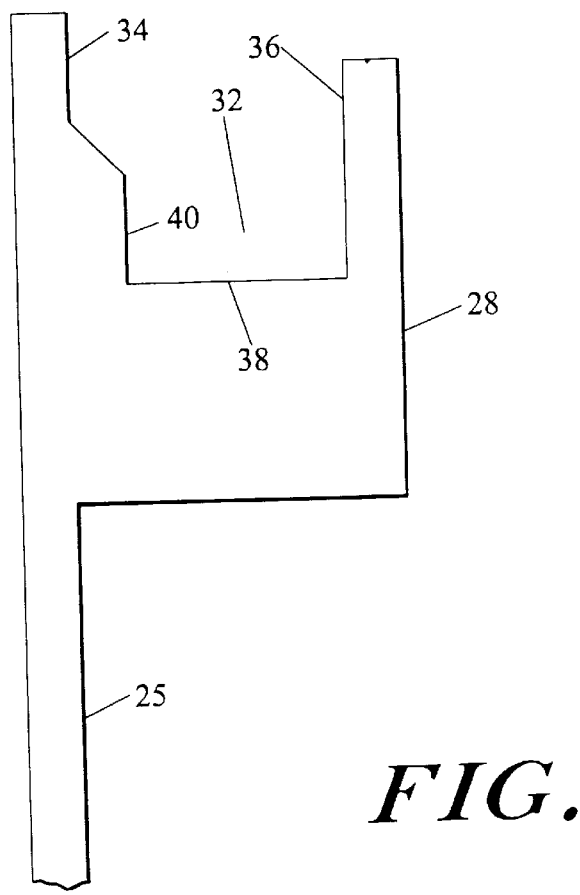
FIG. 3 is a cutaway side view of the wall of a filter hub, showing the channel in which a filter cloth is positioned.

As is best shown in FIG. 3, which is a cutaway side view of neck 28, neck 28 has a recessed channel 32 therein that is defined by the wall 34 of neck 28, wall 36 of tube 25, and a floor 38 connecting wall 34 and wall 36. A spacer 40 protrudes from wall 34 to further define channel 32, and direct the flow of the softened bonding agent into the channel. It will be readily appreciated that neck 30 is the mirror image of neck 28 with an identical structure as shown in FIG. 3. Further in an effort to avoid redundancy, it will be understood that in the foregoing discussion the structure and functionality described in relation to neck 28 applies also to the structure and functionality related to neck 30.

One of ordinary skill in the art will recognize that hub 20 may be constructed without a protruding neck as shown in FIG. 2, and in one alternative embodiment of the invention may have a channel cut into the sidewalls of the hub to provide the same functionality.

Figure 4:
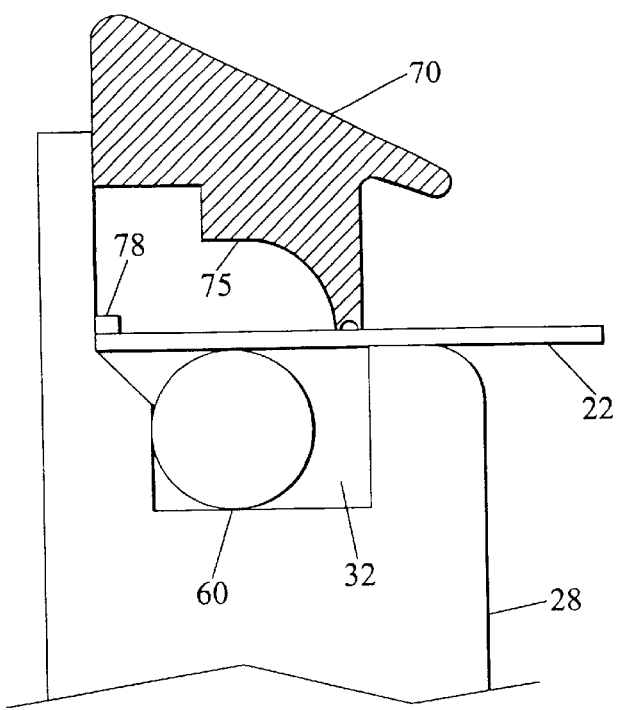
FIG. 4 is a cutaway side view of the neck of a hub, showing the positioning of the bonding agent and the filter cloth in the channel of the neck and being enclosed by a ring.

The join of filter cloth 22 and hub 20 is accomplished in the following manner with reference to FIG. 4. A strand of a bonding agent 60 that is mixed with a metal powder is positioned in channel 32. Bonding agent 60 is preferably a polypropylene strand. The metal powder mixed with the bonding agent 60 is preferably a ferrous metal powder such as iron oxide or a stainless steel powder. The higher the quantity of metal powder in the bonding agent, the more intense will be the inductive heating. Thus it is preferable to use as much metal powder in the bonding agent as possible without sacrificing the ability of the mixture to flow. In a preferred embodiment, the metal powder is approximately 50% to 70% by weight of the mixture. It is highly desirable that the mixture flow since the flow will compensate for any localized inability of the bonding agent to soften. The metal powder is distributed by hot rolling an extruded mixture of thermoplastic and the metal powder. A sheet of filter cloth 22 is cut with an opening so as not to obstruct the free passage of the filtered material through the bore of the hub 20. As shown in FIG. 4, the periphery of the opening in filter cloth 22 is sized to overlay the channel 32 in neck 28 of hub 20, without obstructing the bore of the hub. Filter cloth 22 is thus placed in contact with bonding agent 60.

Continuing with reference to FIG. 4, a press fit ring 70 is annular in shape and sized to fit in channel 32 and enclose both the bonding agent 60 and filter cloth 22 inside. The underside 75 of press fit ring 70, the side of the ring 70 in contact with cloth 22, is shaped to push the bonding agent 60 toward the center of the channel 32 and wrap around the filter cloth so that the cloth cannot be snapped out of the channel. In an alternative embodiment, the filter cloth 22 includes a protruding ring 78 of material to create a ridge at the periphery of the hole in the cloth to further lock the cloth under ring 70, and prevent the filter cloth from being pulled out from underneath the channel 32. The protruding ring 78 may be created from an additional ring of filter cloth stitched to the main cloth or a ring of polypropylene. Preferably, the underside has a portion with an arcuate shape. Again, it will be appreciated that neck 30 has a corresponding press fit ring 72 associated with the opposing end of hub 20 to that of neck 28, and provides the same functionality as press fit ring 70.

Filter hub 20 is attached to two sheets of filter cloth 22 and 24 at opposing ends of hub 20 and mechanically locked in place by the depression of a press fit rings 70 and 72 in the separate channels corresponding to neck 28 and neck 30 to enclose the filter cloths 22 and 24. Having described the assembly of filter screen 10, the procedure for bonding the cloths 22 and 24 to the hub 20 is now described.

Figure 5:
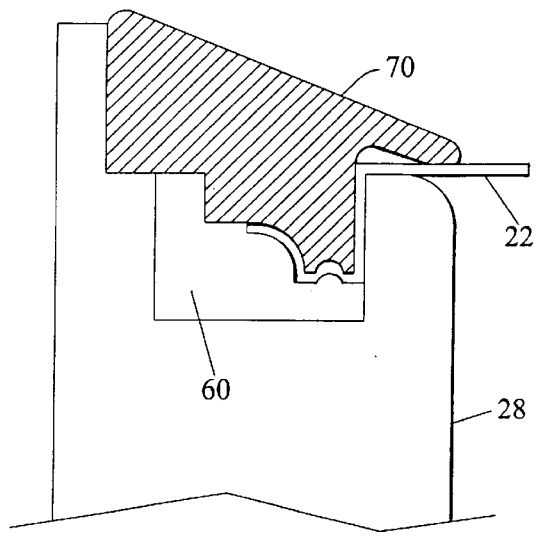
FIG. 5 is a cutaway side view of the neck of a hub, showing the positioning of the bonding agent and the filter cloth in the channel of the neck and being enclosed by a ring after induction heating of the bonding agent.
Figure 6:
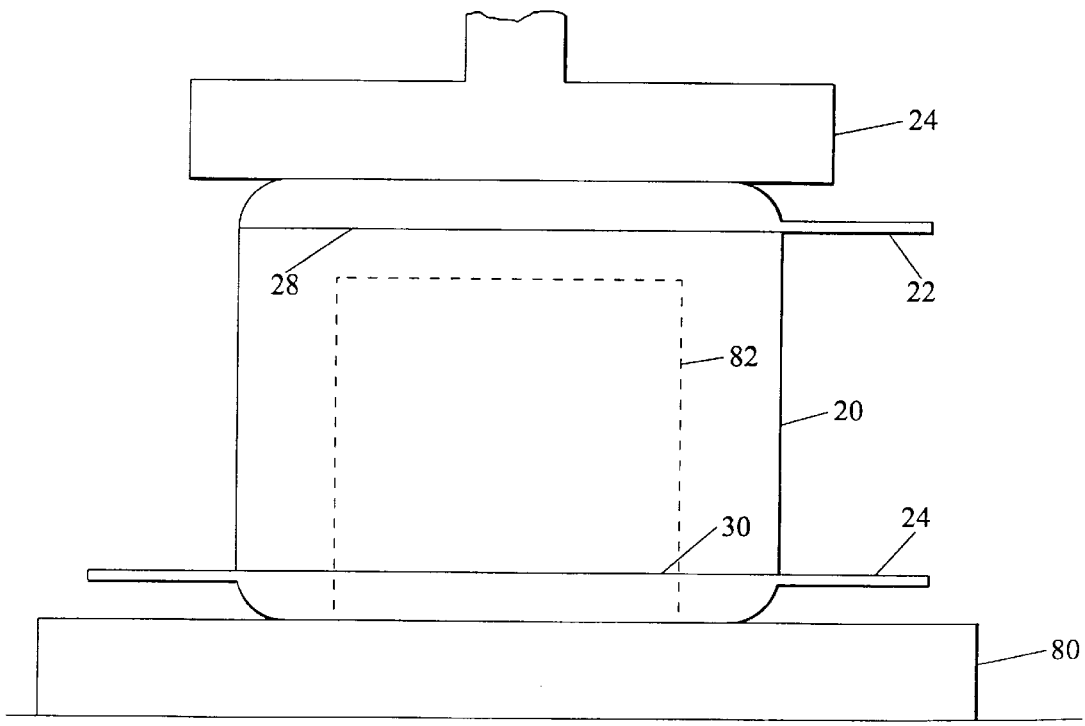
FIG. 6 is a side view of the apparatus used to fabricate a filter screen in accordance with the invention.

Referring now to FIG. 6, the filter screen 10, (i.e. the hub 20 with filter cloths 22 and 24 enclosed by press fit rings 70 and 72 in opposing channels corresponding to neck 28 and neck 30) is placed on a copper base coil 80 which can be electrically activated to generate RF radiation and is aligned by a center post 82 (shown in dashed lines in the drawing) through the bore of hub 20. The center alignment post 82 incorporates a copper ring which is electrically passive for intensifying a local RF field. A second coil 84 that is capable of being electrically activated is contained above the assembly and attached to a vertical cylinder. A passive coil at the top of the alignment post mirrors the base coil. The assembly is clamped together by activating the vertical cylinder to exert pressure on the top of the assembly. One of ordinary skill in the art will recognize that coil 84 may be static and the base coil 80 moved up to force the assembly to clamp together. The top and bottom coils 80 and 82 are activated to produce induction heating of the bonding agent 60. By the term induction heating is meant the use of primarily radio frequencies which act to heat the metal powder in the bonding agent 60 and soften it. As is shown in FIG. 5 for ring 70 and neck 28, ring 70 depresses into the melting bonding material 60 due to the clamping forces on the assembly and the softening of the bonding agent 60 due to induction heating. The angle and radius design of the underside of ring 70 pinches the filter cloth 22 and "locks" the cloth 22 into place. Similarly, ring 72 for corresponding neck 30 is depressed into the bonding material at the opposing end of hub 20. The angle and radius design of the underside of ring 72 pinches and "locks" the filter cloth 24 into place. Ring 70 is bonded to neck 28, and ring 72 is bonded to neck 30 where they are held firmly in the depressed position to form a watertight seal. Upon deactivation of the RF induction heating cycle and the setting of the bonding agent, the clamping force is removed. The filter cloths 22 and 24 are thus bonded to the hub 20.

In another embodiment of the invention, small holes may be cut into the filter cloths 22 and 24 or rings 70 and 72 to allow the bonding agent to flow through and further attach the rings 70 and 72 to the hub 20, similar to the action of a rivet.

It is thus seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A method of making a filter screen including the steps of:
   providing a filter hub, having a longitudinal bore therethrough, with a channel extending longitudinally into the wall of said hub;
   positioning a bonding agent mixed with a metal powder within said channel formed in the wall of said filter hub;
   locating a piece of filter cloth within said channel;
   positioning a press ring to cover said filter cloth and said bonding agent within said channel;
   heating by induction said metal powder to bond and fixedly retain said filter cloth and said press ring in said channel.

2. The method of claim 1 wherein while heating said metal powder, said press ring is forced inward into said channel.

3. The method of claim 2 wherein said filter cloth is retained in said channel, by mechanically locking and bonding said filter cloth in said channel.

4. The method of claim 3 wherein said press ring pinches said filter cloth to mechanically lock said cloth in said channel.

5. The method of claim 1 wherein said filter hub has a circular cross section.

6. The method of claim 1 wherein said filter hub has a polygonal cross section.

7. The method of claim 1 wherein said filter hub is selected from nylon, polypropylene, or polyester.

8. The method of claim 1 wherein said press ring is fabricated from thermoplastic rubber.

9. The method of claim 1 wherein said step of heating by induction involves radiating said metal powder with RF radiation.

10. The method of claim 1 wherein said bonding agent is polypropylene and said metal powder is ferrous based.

11. A method of making a filter including the steps of:
    providing a filter hub having a longitudinal bore therethrough, and having a channel extending longitudinally into the wall of said hub, at each opposing end;
    positioning a bonding agent mixed with a metal powder within each of said channels;
    locating a piece of filter cloth corresponding to each channel within each of said channels;
    positioning a press fit ring corresponding to each channel to cover each of said filter cloths and each of said bonding agents within each of said channels;
    heating by induction each of said metal powders in said channels to fixedly secure and bond said filter cloths and said press rings into said channels.

* * * * *